Oct. 29, 1957     T. SENDZIMIR     2,811,060
PLANETARY REDUCING MILLS
Original Filed July 22, 1947     5 Sheets—Sheet 1

INVENTOR.
TADEUSZ SENDZIMIR.
BY Allen & Allen
ATTORNEYS.

Oct. 29, 1957 T. SENDZIMIR 2,811,060
PLANETARY REDUCING MILLS
Original Filed July 22, 1947 5 Sheets-Sheet 2

INVENTOR.
TADEUSZ SENDZIMIR.
BY Allen & Allen
ATTORNEYS.

INVENTOR.
TADEUSZ SENDZIMIR.
BY Allen & Allen
ATTORNEYS.

Oct. 29, 1957 T. SENDZIMIR 2,811,060
PLANETARY REDUCING MILLS
Original Filed July 22, 1947 5 Sheets-Sheet 5

FIG. 17.

INVENTOR.
TADEUSZ SENDZIMIR.
BY Allen & Allen
ATTORNEYS.

United States Patent Office 2,811,060
Patented Oct. 29, 1957

2,811,060

PLANETARY REDUCING MILLS

Tadeusz Sendzimir, Waterbury, Conn., assignor, by mesne assignments, of three-fortieths to Tadeusz Sendzimir and Bertha M. Sendzimir, as trustees Original application July 22, 1947, Serial No. 762,683. Divided and this application June 7, 1954, Serial No. 434,823

14 Claims. (Cl. 80—43)

This application is a division of my copending application Serial No. 762,683, filed July 22, 1947, entitled Planetary Reducing Mills and Method, now abandoned.

This invention relates to planetary reducing instrumentalities of types generally described and claimed in my copending application entitled Apparatus for the Production of Metallic Strips, Serial No. 582,344, filed March 12, 1945, now abandoned. In such a planetary mill a slab of metal is fed at a predetermined velocity by positively acting and suitably powerful feeding means into a reducing instrumentality wherein a procession of pairs of reducing rolls engage and act upon it. These reducing rolls move forwardly in the same direction as the slab but at a higher velocity, and they simultaneously converge toward each other until the opening between them is equal to the thickness of the finished rolled piece, or strip, after which they diverge again. The reducing rolls are arranged in a planetary fashion about the periphery of a pair of larger rolls. Power is supplied not only to the slab for feeding it into the operating zone of the reducing rolls, but also to the planetary system for moving the reducing rolls along the slab.

The principal objects of this invention are the provision of improvements in the mechanism of reducing instrumentalities of this type and the provision of new and improved modes of operation. These and the more specific objects of the invention, which will be developed in the ensuing description or will be apparent to the skilled worker in the art upon reading these specifications, I accomplish in those procedures and in those structures and arrangements of parts, of which I shall now describe certain exemplary embodiments. In the accompanying drawings the reducing instrumentalities are indicated largely diagrammatically, and reference may be made to my copending application as noted above for details of mill construction. In the accompanying drawings:

In a planetary mill of the type referred to herein, the direction of movement (Fig. 1, arrows $A_1$ and $A_2$) of the reducing rolls is initially oblique to the direction of movement of the slab (arrow $A_3$) because of the converging paths of the reducing rolls in the several pairs. The wedge-shaped portion of the slab undergoing reduction is subjected to the two-directional compression, one component being normal to the direction of slab motion and arising from the pressure exerted upon the slab by the opposed reducing rolls, and the other component being axial and arising from the forward thrust of the feeding means, applied against the rearward thrust exerted by the reducing rolls.

This condition gives to the operation of the planetary mill an important advantage over the kind of plastic reduction produced by conventional rolling means wherein a stationary pair of reducing rolls engages the work piece and exerts vertical pressure thereon. Within the roll bite in conventional rolling means there will be a no-slip point at which the speed of travel of the work piece is equal to the speed of travel of the surface of the work rolls. Ahead of this point the reduced piece travels faster than the roll surfaces, while behind it the work piece is retarded. Hence tension is produced within the area of plastic deformation; and because of this tension, materials which are not highly ductile tend to crack and may even disintegrate.

By way of example, a cast slab or ingot of a low carbon steel heated to a proper rolling temperature of, say, 2200° F. must be rolled on a conventional blooming mill with great care and initially with very small reductions until the brittle cast structure or dendritic structure of the ingot is gradually transformed into a forged structure which is more ductile. The same cast slab or ingot, when rolled on a planetary mill, can be carried down to strip gauge in a single pass without cracking, providing this is done under a proper correlation of the forces in a two-directional compression system, since it is possible to cause all grain slippage and flow to take place under conditions of compression rather than tension. Moreover, the slab does not need to be heated to so high a temperature, and can be reduced drastically at a heat as low as 1500° F.

Figure 4:
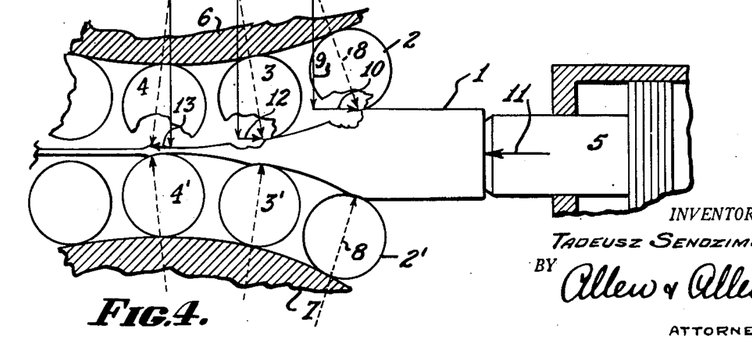
Fig. 4 is a diagrammatic view of reducing rolls in contact with a slab showing the force components acting upon the rolls and slab.

Referring to Fig. 4, I have shown a slab 1 engaged by pairs of planetary work rolls 2, 2', 3, 3', and 4, 4'. The slab is being forced into the operating zone of these pairs of work rolls by a powered feeding device diagrammatically represented as the piston rod 5 of an hydraulic cylinder. The work rolls of each pair are shown as backed by rolls 6 and 7 turning respectively in clockwise and counterclockwise directions in the diagram. The respective work rolls roll upon the surfaces of the backing rolls 6 and 7 which thus not only sustain the forces of operation imposed upon the work rolls, but also drive the work rolls by frictional contact forwardly in the direction of motion of the slab 1 and at a substantially higher speed.

As any one pair of rolls, such as the pair 2, 2', enters the operating zone, a force 8 is set up against the slab. This force is not a single force, but rather the sum of many forces acting as pressure and distributed over the whole area of contact between the work rolls of the pair and the slab 1. The force 8 is thus a resultant force which comprises a vertical or normal component 9 and a horizontal or axial component 10. The vertical component 9 of the work roll 2 is resisted through the slab 1 by the vertical component 9 of the opposing work roll 2'. But the horizontal component 10 of both work rolls must be resisted by a force 11 supplied by the feeding mechanism. It will now be clear why the portion of the slab between the work rolls 2 and 2' and between this pair of work rolls and the feeding mechanism is in a state of two-directional compression.

The rolling action of the planetary work rolls as they pass through the active zone is such that each roll effects a relatively light reduction at the thick portion of the slab. The large number of such light passes, each producing a small individual plastic deformation, is of further benefit in producing a heavy total reduction without the danger of internal cracks. In effect the slab is subjected to a large number of light passes over its cast or dendritic structure, while the deformation is caused to take place in the absence of tension but rather under compression. Beyond the first major portion of the active zone, the central portion of the slab 1 will be found already to have acquired a forged structure and hence greater ductility. From this point on through the roll bite, the slab is subjected to increasingly higher reductions percentagewise up to the point at which the final strip gauge is established, beyond which point the rolls of each pair follow divergent paths.

Remembering that the pairs of work rolls move ahead in the direction of motion of the slab, it will be seen that the rearward thrust component diminishes with their movement. When the rolls have attained the positions shown at 3, 3', a substantially smaller rearward thrust is indicated at 12. When the rolls have attained the positions shown at 4, 4', the horizontal thrust component 13, while still small, is in the reverse direction thus tending to pull the slab forward instead of resisting its forward motion. Tensional stresses thus exist between the rolls 4, 4' and the nearest member or members resisting the forward motion of this slab, in this example, the work rolls 3, 3'; but since the dendritic structure of the metal has already been broken down in the earlier portion of the roll bite, the tensional stresses cause no trouble and instead assist in leveling out the strip, reducing the roll-separating forces as is understood in the art.

Figure 1:
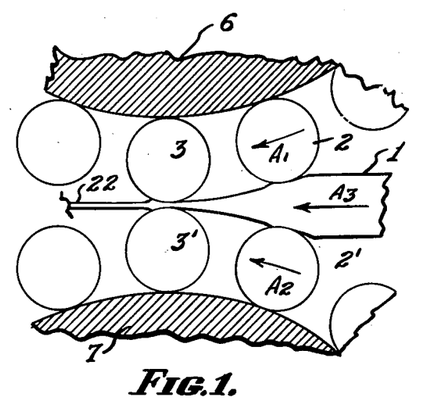
Fig. 1 is a diagrammatic view showing the engagement of reducing rolls with the work piece in one type of operation.
Figure 2:
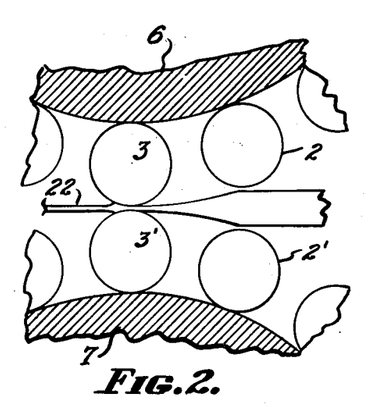
Fig. 2 is a diagrammatic view showing the engagement of reducing rolls with the work piece in a modified operation.

In Fig. 4 I have shown an operation in which the maximum number of roll pairs in contact with the slab at any one time is three, and the minimum two. Fig. 1 shows an operation with a maximum of two and a minimum of one pair of rolls in contact with the work piece. Fig. 2 shows an operation in which one pair of work rolls only is in contact with the work piece at any one time, but an interval occurs between the departure of a pair of work rolls from the work zone and the entrance of the next pair into the work zone. Operations are, of course, possible in which larger numbers of pairs of work rolls are in simultaneous engagement with the slab than illustrated in Fig. 4. It will be understood that the number of pairs of work rolls simultaneously engaging the work piece can be varied for slabs of any given thickness by using mills differing from each other in the spacing of planetary rolls in the two orbits and in the diameters of the orbits themselves. In any one mill the number of pairs of work rolls simultaneously in contact with the work piece can be varied by varying the starting thickness of the work piece. There are distinct fields of utility for operations involving different numbers of pairs of work rolls in the active zone; and different kinds of precautions which must be taken, as will hereinafter be set forth.

Figure 3:
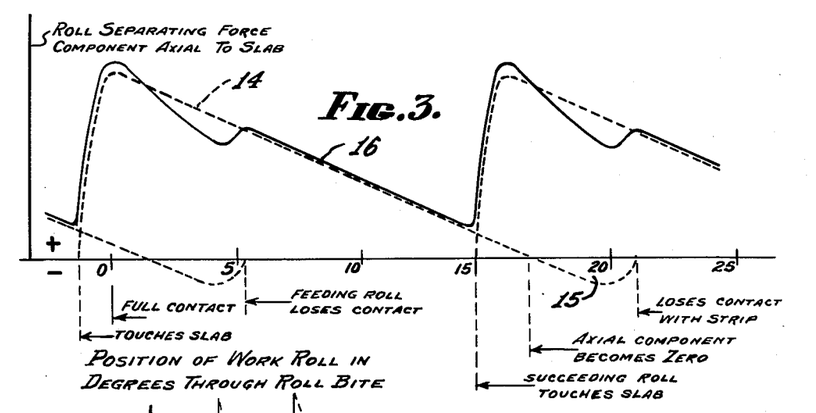
Fig. 3 is a diagram showing the components of the planetary rolling forces axial of the slab.

In Fig. 3 I have made a diagrammatic showing of the magnitude of the total feeding force required in relation to the positions of pairs of work rolls. For an exemplary bite angle, the dotted curves show the feeding forces required for one pair of work rolls. If a single one of these dotted curves, say, the curve 14 is considered, it may be taken as representing the force required for a pair of work rolls which is the only pair of work rolls in contact with the work piece at any given instant. This condition is illustrated in Fig. 2. It will be noted that the rearward force indicated by the plus sign increases very rapidly to a maximum at the instant of full contact of the roll pair with the work piece and then gradually diminishes to zero, ending in a reversed or forward force in the area 15.

When more than one pair of work rolls is in contact with the work piece, the forward force exerted by the pair of work rolls which is about to leave the surface of the slab is counterbalanced by the rearward thrust of another pair or pairs. The solid line 16 in the diagram of Fig. 3 is the resultant of the various forces in a system of this kind. It will be noted that it varies in magnitude but lies continuously to the positive side of the zero force line. The greater the number of pairs of rolls contacting the work piece at any given time, the flatter will be the curve 16.

It will be understood that the vertical component of the forces exerted by the work rolls on the piece also fluctuates during each cycle, and that there is relatively a great difference between the magnitude of the maximum and minimum of the total roll separating forces. In Fig. 2 when a work roll pair approaches the center line of the planetary assembly, as at 3, 3', the roll separating force becomes greatest. When rolls 3, 3' lose contact with the work piece and before the next following rolls 2, 2' engage the piece, the roll separating force falls to zero. Again, in an operation such as shown in Fig. 1, where one pair of rolls is always in contact with the work piece, but two pairs are in contact with it during a portion of each cycle, there will be a great difference between maximum and minimum roll separating forces.

In both cases, the variations in magnitude of the total roll separating force will cause the mill housing and other members to stretch elastically in proportion with the momentary load.

It will be clear that a certain measure of elasticity in the housing and other parts participating in the bearing of such a load as is transmitted to the backing roll bearings, is of advantage in my mill in contradistinction to its disadvantage in conventional mill design where high rigidity is always preferable.

As each successive pair of work rolls progresses through the roll bite, each pair produces a certain short length of finished strip. This length, however, is not of absolutely uniform gauge measured in the direction of the length of the strip, because the rolls have been following arcuate rather than straight and parallel paths while rolling the slab. If each gauge variation is relatively long in the direction of rolling, it becomes visible and is referred to as a "scallop."

The successive scallops become relatively more pronounced the greater the rigidity of the mill. But, with a mill having an elastic housing, the centers around which the arcs of travel of the work rolls are described vary in their distance one from another, depending upon the magnitude of the elastic stretch in the mill members, which in turn depends upon the momentary roll separating force. This movement of the centers tends to straighten out the arcuate paths, and the product of the mill becomes more nearly free from scallops.

This effect can be increased or decreased by changing the strength of the backing elements of the mill. In the diagrams making up the drawings of this application I have illustrated only the planetary assembly of working and backing rolls in which the backing rolls 6 and 7 sustain the roll separating forces, and as in conventional mills, transmit them to the housing members through their roll necks. It will be understood, however, by reference to my copending application that my mills may be so constructed that the working rolls at positions substantially diametrically opposite the active zone engage the inner surfaces (or members mounted on those surfaces) of beams extending transversely of the mill between the end housings thereof. In this way the roll separating forces may be applied ultimately against such beams instead of against the resistance-to-bending of the backing rolls 6 and 7, thereby making it possible to employ any desired roll diameters, large or small, regardless of the width of the mill. With this type of roll backing, the backing beams are shaped so as to compensate for bending deflections, thereby producing flatter strip, from edge to edge, than the construction described above.

By proportioning the relative thickness of the slab to the over-all diameters of the planetary assemblies, taking relatively light overall reductions, the sum of the axial force components 10, 12 and 13 can be made to lie in the feeding direction. This is not ordinarily advantageous because of the low reductions involved for planetary roll assemblies of economical proportions; but it has certain uses, as in the cold rolling of plate material (e. g. ⅜ to ⅝ in. thick) down to thin sheet gauges wherein the total reductions are small and the overall planetary roll bite angle is within the required limits.

If the net force is in the forward direction, the feeding mechanism will have to pull back on the slab. Where this is done, the feeding mechanism may be separated from the mill by a furnace or other heating means giving the advantage that the feeding mechanism operates on cold portions of the slab. The effect of two-directional compression which has been discussed above is not obtained in this instance.

As indicated in connection with Fig. 2, in an operation involving a relatively large bite angle in which only a single pair of work rolls contacts the work piece at any given time, the sign of the feeding force changes from push to pull during the operation of each roll pair. If a feeding means is provided capable of producing only a forward thrust on the slab, proper rolling will be found to be impossible because the slab will be drawn into the roll bite further during each cycle (at the time when the conversion from push to pull occurs) than is correct for the engagement of the next pair of work rolls, and the mill is likely to be damaged. I have found that this difficulty may be cured by providing a type of feeding means which can act not only to thrust the slab forwardly when the operation of a pair of work rolls tends to thrust it rearwardly, but also to hold back on the work piece at the time when the operation of the same pair of work rolls tends to draw the piece into the roll bite. Such a feeding mechanism will be described hereinafter.

In rolling operations wherein the slab is never out of contact with one or more pairs of work rolls, the feeding force will be, as shown in Fig. 3, always in the positive or forward direction, though in operations wherein small numbers of pairs of work rolls contact the piece, there may be wide variations in the rearward thrust produced by the work roll pairs. In view of such wide variations, a feeding means capable of feeding the slab to the roll bite at a constant rate and with a force proportional to the rearward thrust is advantageous; but since there is always a net rearward thrust, the feeding force will always be in the positive direction. So long as the net thrust of the work rolls on the slab is in the rearward direction, the sliding in the crystal lattice occurs under conditions of two-directional compression which is advantageous for the heavy reduction of work pieces having a dendritic structure or otherwise characterized by lack of ductility. By operating with fewer pairs of work rolls in simultaneous contact with the piece, there is a reduction both of the required feeding force and of the roll separating force, and such operations may be found advantageous especially when reducing metals which work harden within the roll bite. In such operations a major improvement in both the quality and flatness of the strip and the action of the planetary mill itself and a reduction in the roll separating force on the finishing pair of work rolls may be obtained by exerting tension on the finished strip at the exit side of the mill. Further, by applying tension to the strip in the roll bite, it is made to come out flat and free from minor waves, cambers, or buckles caused by slight maladjustment in the mill and slight errors of roll shape.

Figures 5, 6:
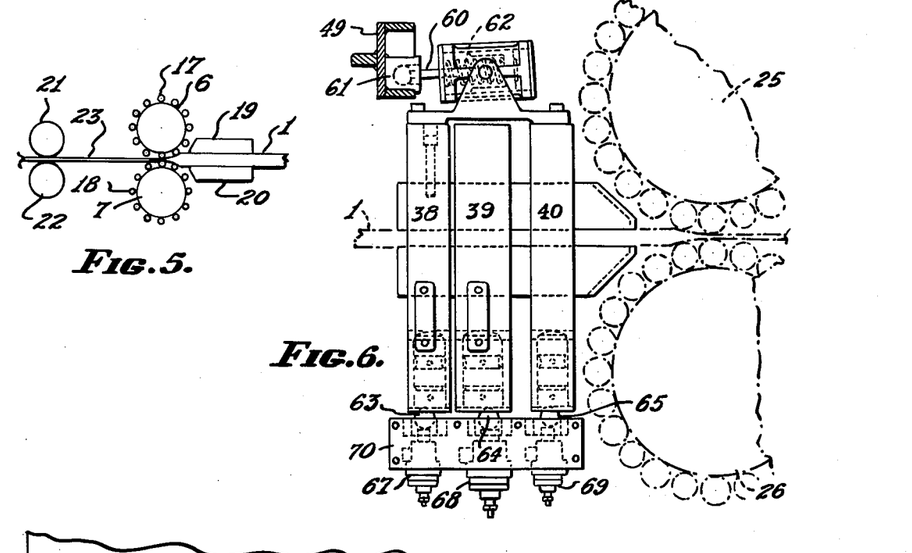
Fig. 5 is a diagrammatic elevational view of a mill, feeding means and means for exerting exit tension on the rolled piece.
Fig. 6 is a side elevational view of a feeding means.

In Fig. 5 I have shown a mill having backing rolls 6 and 7 and planetary rolls 17 and 18 so spaced and proportioned to the thickness of the slab 1 that no more than two pairs of the planetary rolls are in contact with it at any one time, even though a relatively large overall bite angle is involved. I have indicated diagrammatically at 19 and 20 feeding means in the form of shoes acting not only to advance the slab 1 against rearward thrust, but also to control its forward movement at times when the thrust becomes very low or changes to an opposite sign. I have further shown a pair of pinch rolls 21 and 22 on the outgoing side of the mill and engaging the rolled strip 23. These rolls can pull a certain percentage of the total force required according to the gauge and temperature of the strip.

As pointed out in my copending application, it has been observed that as the planetary work rolls first engage the slab at the point where it has its original or maximum thickness, these relatively small work rolls reduce surface portions of the slab more than the central portion thereof which means that the surface layer spreads more than the center portion of the slab. This produces two effects: first, the side edges of the slab within the roll bite become concave, and, second, a back fin may be produced on one or both faces of the slab.

The first of these effects is opposite to that which occurs in the ordinary rolling mill. The making of a heavy reduction in a thick piece between rotating rolls which are stationary in space tends to reduce the central portion of the slab more than its outer surfaces, producing a slab with rounded edges. In my copending application ti was pointed out that the concavity or production of side fins in the planetary mill could be overcome by beveling the side edges of the slab.

While the production of a back fin on the slab has certain uses, as where it is desired to scarf the slab or remove a surface layer from it, it was pointed out in my copending application that the back fin could be avoided by selecting a small enough bite angle. Thus a back fin may be minimized or prevented with any given mill and slab by sufficiently diminishing the over-all reduction, or for a given slab thickness and reduction, by selecting a planetary mill having a sufficiently large diameter of backing roll. Either of these solutions may be costly or otherwise undesirable; and one of the objects of this invention is the provision of a mode of operation whereby over-reduction of surface portions of the slab can be prevented, with the concurrent prevention of edge concavity and back fins, and the attainment of other advantages, as will be set forth.

In my planetary mill the work roll pairs move forwardly over the surfaces of the slab in the active zone. The speed of translation of the work rolls in their planetary orbits is independent of the rate of production of the rolled material. The rate of production is dependent upon the rate of feeding of the slab into the active zone. Hence, the same reductions in the same time intervals can be effected by providing the same rate of feed, but with very wide variations in the speed of translation of the work rolls.

The energy expended in the plastic deformation of the slab generates heat which tends to raise the temperature of the slab. The temperature rise is, however, a function of the rate of production, i. e. the energy expended per unit of time on any given portion of the slab. But I have discovered that for relatively low rates of production the work rolls, being at a lower temperature than the slab, tend to abstract heat from it, and further that if the feeding speed remains the same, an increase in the speed of translation of the planetary work rolls has the effect of cooling the surface layer of the strip to a greater extent. At any given rate of production, this cooling effect may be carried to such an extent as to render the surface of the slab more resistant to plastic deformation. This effect may be heightened by cooling the planetary work rolls or the outside surface of the slab, or both, by suitable means such as water sprays.

It is not usually desirable to exert a general cooling effect upon the slab. Rolling in the planetary mill is under most circumstances preferably carried on with the slab in a heat-softened condition. For example, I prefer to roll steel slabs at a moderate red heat. I have found that if the surface portions of the slab can be maintained in the first major portion of the active zone at a temperature continuously lower than the temperature of interior portions of the slab in the same zone, the work rolls will have a more penetrating effect in plastically deforming the inner portions of the slab, and, depending upon the maintenance of a proper temperature differential, it is possible to make the surface layers of the slab sufficiently resistant to plastic deformation to obviate the formation of side concavities and back fins. In the last portion of the active zone, from the point where the slab has reached a three-to-one or higher elongation, it is preferable to reduce the surface layer at substantially the same rate as the center. This is accomplished by cooling the surface as little as is practicable in the initial portion of the active zone, so that, although it is cool enough to give the desired effect at that stage, it will have become practically the same temperature as the central portion of the latter stage.

The maintenance of a suitable heat differential involves such factors as the physical characteristics, mass and initial heat of the slab, the rate of production and hence the heating effect on the slab due to the energy expended in its reduction, and the rate of cooling of external layers of the slab. By way of example, in initial work with the planetary mill, steel slabs having a thickness of from one to one and one-half inches were rolled at a moderate red heat with a feeding speed of 20 to 40 inches per minute, the planetary work rolls having a linear speed of from 200 to 500 feet per minute.

When taking reductions on the planetary mill in one particular case, a one by six inch low carbon steel bar being reduced down to .050 in. thick by six and one/thirty-second inch wide, and using rolling speeds such as are commonly used on conventional hot roughing mill equipment, I found that the bar, which was fed forwardly at around 1400° F., was losing a slight amount of heat in the roll bite due to rapid cooling by the planetary rolls, and the finished, rolled strip was emerging from the mill at around 1300° F. Having in mind that it is desirable to run the planetary rolls faster so as to reduce the width of the scallops, as will later be explained, I made repeated tests in which the bars were rolled at the same rate of feed, which was around thirty inches per minute, but the speed of lateral translation of the planetary backing rolls was increased to around 204 feet per minute, which was double the previously normal operating speed. It was noticed that heat was being extracted from the slab in the roll bite at so fast a rate that the strip was emerging almost black.

I then conducted further research work, using both different feeding speeds and higher mill speeds on the same and heavier bar sections. Unexpectedly, it was found that after a certain critical feeding speed for the bar was exceeded, the mill speed could be increased almost at will, i. e. to the point where the scallops entirely disappeared, and yet the finished strip remained reasonably hot.

This discovery enabled me to gain important advantages in mill operation. Not only is the quality and appearance of the finished product greatly improved, but also the individual planetary work rolls are caused to take rather small bites of the metal of the bar, and the mill load decreases considerably. In this way, as the speed of translation of the planetary rolls increases, there is an easing off of the mill pressure. Furthermore, I have found that the light and short contacts between the work rolls and the heated bar reduce the wearing of the work rolls and the damage which can be attributed to heating.

Thus, in operating the mill with increased speeds of translation of the work rolls and increased feeding speeds, it was first noticed that a somewhat less than proportional increase in the feeding rate was necessary in order to maintain the desired temperature in the central portion of the slab in the roll bite. Finally, a feeding speed was reached at which the speed of translation of the work rolls could be increased quite out of proportion to the feeding speed, and still the temperature of the central portions of the slab remained uniform or increased somewhat. Yet, by varying the speed of the work rolls, the temperature of the actual surface of the metal in the roll bite could be cooled substantially as desired; and I was able in this way to produce a temperature gradient throughout the slab in the roll bite which minimized or eliminated the formation of side and back fins while the general plasticity of the slab was preserved.

I believe the explanation of this phenomenon to be the following:

Since the slab can lose its heat in the roll bite only through its surfaces, the rate of heat conduction in the slab within the roll bite being fixed though different for each material being rolled, and depending upon its specific heat, the slab can lose through its surfaces only a certain amount of heat from its interior dependent upon the rate of heat conduction from the interior to the surfaces under the particular circumstances. Thus, since fresh energy in the form of heat is developed within the interior of the slab by the increased rate of production, a higher temperature gradient can be maintained between the central portions of the slab and the adjacent surfaces of it.

In other words, I have found it readily possible to arrive at a point where the heat generated throughout the slab by the energy expended in plastic deformation offsets or more than offsets the loss of heat in the interior of the slab by heat conduction, the rate of heat conduction being limited as aforesaid, and this enables me to cool the exterior surfaces of the slab without essentially cooling the interior portions of it. It is easy to maintain the operation of the mill at and beyond this point, under which circumstances the resistance to plastic deformation of exterior surface portions of the slab is so much greater than the resistance to plastic deformation of the interior of the slab that the reduction proceeds uniformly without the production of edge concavities and back fins, in spite of a high rate of production, and while permitting a relatively high bite angle. The actual constants will vary with the type of mill, spacing of planetary rolls, diameters of the planetary orbits, mass of the slabs, and the particular metal being rolled, as well as the application and nature of additional cooling means. However, the requisite conditions are easily attained and maintained in view of these teachings, because the production of edge concavity and back fins is a readily observable phenomenon.

As indicated above, in order to accentuate still further the difference in temperature between the center and the surface of the slab, I employ in some cases artificial cooling both on the planetary work rolls and on the slab. The latter cooling may be in the form of water jets applied to the slab just ahead of the roll bite. If the slab carries scale, these jets may be employed as descaling jets. With an operation involving the maintenance of a heat equilibrium as described, it is readily possible to reduce a cast slab or ingot directly into a plate or strip, using a relatively large roll bite, and yet producing no back fins, providing the cool surface layers of the slab are sufficiently thick in proportion to the diameter of the planetary work rolls, yet thin in proportion to the total thickness of the slab.

In my mill, the speed of translation of the planetary work rolls is, as I have indicated, essentially independent of the feeding speed of the slab. The maintenance of a heat equilibrium, as described above, involves the use of speeds of translation of the work rolls which are very high in relation to the feeding speed of the slab. This provides a further advantage in the elimination of scallops. As shown above, the work piece is successively acted upon by pairs of planetary work rolls, which perform their work and then lose contact with the rolled strip successively. If the slab feeding speed (and hence the exit speed of the rolled strip) is high in relation to the speed of translation of the work rolls, relatively wide scallops will be produced on the surface of the rolled strip, because the work rolls describe arcuate rather than straight paths. These are shallow, and it has been shown that they do not interfere with subsequent cold rolling, and that subsequent cold rolling will destroy the visual appearance of scallops in the product of my mill, but may be undesirable where that product is not given an after treatment. As the speed of translation of the planetary work rolls increases out of proportion to the feeding speed, the width of the scallops becomes less and less until the scallops entirely disappear. I have found that if the feed rate of the slab is such that each pair of planetary work rolls produces a length of finished strip less than about 1% or 2% of the diameter of the planetary roll assembly, the scallops become invisible. This enables me to produce a finished product on my mill which is visually indistinguishable from products rolled on conventional mill equipment, and therefore is in every sense of the word a finished product. Another advantage incidental to high mill speed, i. e. a high speed of translation of the work rolls, is a relatively small bite taken by each pair of work rolls, which, as pointed out above, reduces the magnitude of the rolling forces and consequently reduces the magnitude of the necessary feeding force.

Depending upon the mean angle of the roll bite, and the varying numbers of pairs of work rolls operating upon the slab at any given time, the necessary pushing or feeding force will vary, as has been shown above. In most cases the required feeding force will be between one-fourth and three-fourths of the total pressure exerted by the work rolls, and it will be seen that for most operations a powerful feeding means is required. Short lengths of slab may be fed into my reducing instrumentality by a direct pushing means such as a screw or hydraulic cylinder. For feeding long or continuous lengths of slab material, the feeding mechanism must be of a kind to engage the slab material by frictional contact with its flat faces, and at a point relatively close to the planetary roll bite so as to prevent buckling or excessive upsetting of the portion under compression between the planetary roll bite and the feeding means.

The simplest feeding means of this type is one or more pairs of pinch rolls driven at required peripheral speeds of feed slab into the planetary roll bite at the desired rate.

My hot planetary mill is used for reducing heavy slabs, such as those from one inch to five inches in thickness and beyond, down to light gauge strip such as a material .040 inch in thickness, this being accomplished in one pass. Consequently, the slab material is fed forwardly at a relatively low speed, usually from 20 inches to 200 inches per minute. When using feeding means of the roll type, for example, two-high pinch rolls in a single stand or in tandem, such pinch rolls have a contact time at any one spot which may be one-half to two seconds or more. Hence, the temperature of the pinch roll elements in their surface layers momentarily increases considerably. When rolling steel and some other metals at high temperatures, heat cracks are encountered in the feed rolls due to a permanent deformation of the heated surface portions while expanded through heat, and a lessened resistance of these portions to stresses as compared with the colder layers inside the rolls. This reduces the life of these feed rolls.

The use of alloy steel feeding rolls with high mechanical stress resistance at these higher temperatures will prevent the formation of such heat cracks in most cases, especially where the slab is only moderately hot. However, the provision of feeding rolls made of high heat resistant alloys is expensive. In any event, feeding rolls usually abstract a great deal of useful heat from the slab because a relatively cool face of the roll is continually brought into contact with the face of the hot slab.

Again, for purely geometrical reasons, feed rolls must be kept a certain distance away from the bite of the planetary roll assemblies. The distance between this bite and the bite of the feed rolls may be such as to permit buckling of relatively thin slabs, making it necessary to install guiding means which reduce accessibilty and may involve a further heat loss.

The feeding force required is so great that, especially in the rolling of hot, thick slabs, the required frictional contact between the feeding rolls and the slab implies an actual reduction of the slab by the feeding rolls. Again, that portion of the slab extending between the feed rolls and the planetary mill bite is subject to high axial compression so that in some cases it is upset at a constant rate. These factors are in many cases disadvantageous.

A further improvement comprised in the present invention lies in the employment of feeding means gripping the slab by means of a gripping face which stays in contact with the gripped slab while exerting the feeding force. These feeding means involve the use of gripping shoes which travel with the slab, and hence must be released and retracted at the end of each stroke. Therefore, not less than two sets of such gripping shoes must be provided in order to maintain the feeding speed of the slab constant. The gripping shoes may be made to have insulative characteristics as hereinafter set forth so as to preserve the heat of the slab.

Figure 7:
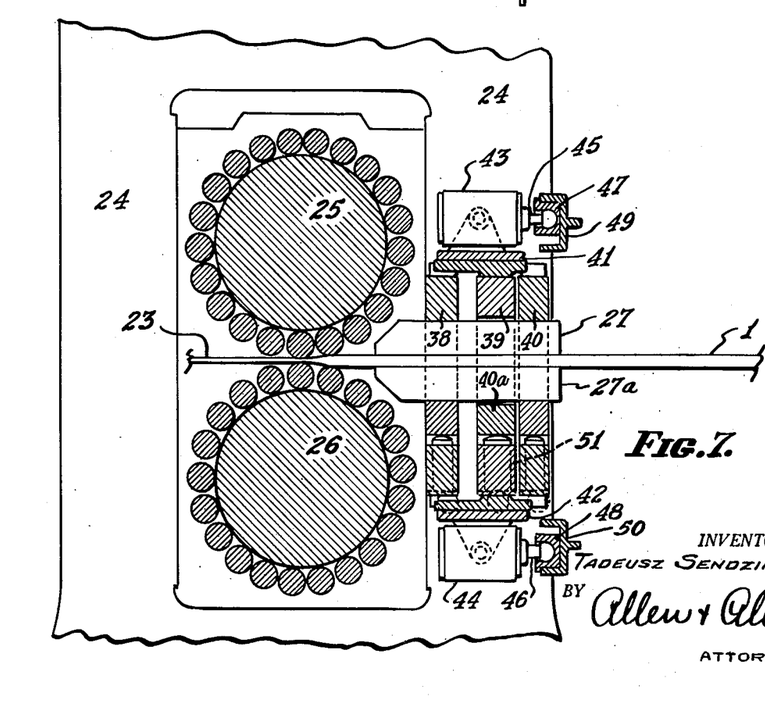
Fig. 7 is a sectional view showing the relation of the feeding means to the mill housings.
Figure 8:
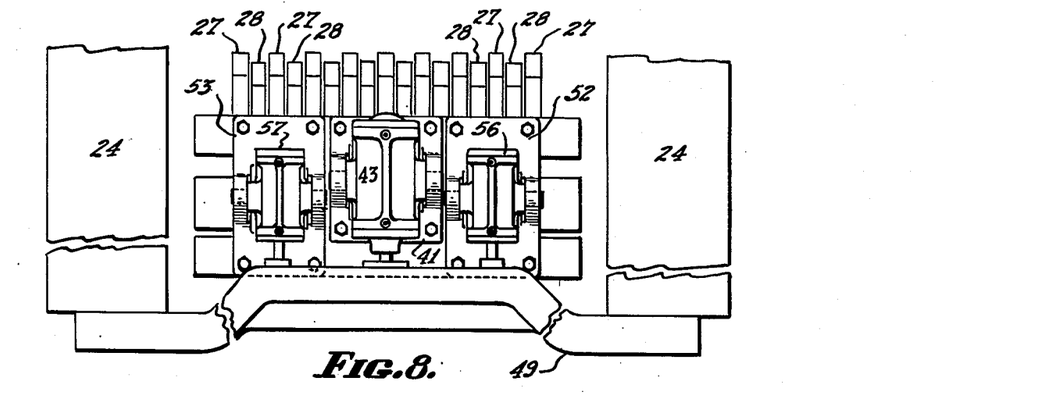
Fig. 8 is a top plan view of the feeding means.

An exemplary embodiment of such a walking beam feeding means is shown in Figs. 6 to 9 inclusive. In Fig. 7 a mill is diagrammatically shown with a housing member 24 and planetary assemblies indicated at 25 and 26. The slab 1, which is being rolled into the strip 23 is shown as fed forwardly by upper and lower gripping shoes, two of which are shown in elevation at 27 and 27a. It will be seen that these gripping shoes are of elongated form, and by tapering the forward ends of them they may be caused to extend forwardly to a position very close to the actual bite of the pairs of working rolls. The slab 1 is supported throughout the gripped area and the juxtaposition of the gripper ends to the roll bite minimizes or prevents buckling.

Figure 9:
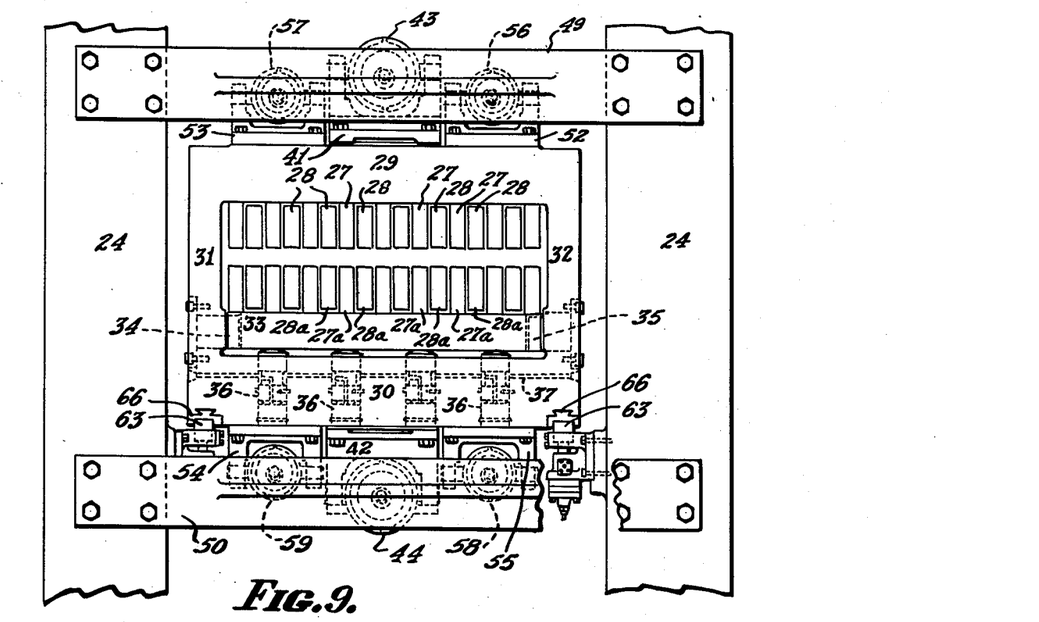
Fig. 9 is a front elevation of the feeding means.

In Fig. 9 it is indicated that a relatively large number of gripping shoes are arranged transversely of the slab, and these gripping shoes are divided into groups. One group comprises the upper shoes 27 and the lower shoes 27a. Another group comprises upper shoes 28 and lower shoes 28a which are arranged intermediate the respective shoes of the first group. Each group of shoes is attached to and mounted upon frame elements which are movable and impart their motion to the shoes themselves.

One of the frame elements is illustrated in elevation in Fig. 9. It comprises a top frame element 29, a bottom frame element 30 and side frame elements 31 and 32. Preferably, though not necessarily, these frame elements are integral parts of a single casting. The upper shoe elements 27 of one group of shoes are attached directly to the upper frame element 29. The lower shoes 27a of the same group are mounted directly upon and attached to a rail element 33 extending across the central opening of the frame. The ends of this rail are slotted, and are engaged by key elements 34 and 35 in the sideframe elements 31 and 32. By these means the motion of the frame as a whole may be imparted to the gripping shoes. The lower frame element 30 contains a plurality of hydraulic cylinders 36, the pistons of which, bearing upon the rail 33, serve to raise this rail for the purpose of gripping the slab 1 between the upper and lower shoes 27 and 27a. The cylinders 36 are interconnected by a passageway 37 for fluid. Connection to this passageway may be made by means of flexible pressure tubing.

Reference to Fig. 7 will indicate that I have provided three frames in the exemplary embodiment. These frames are all of similar construction, except that they may vary one from another in mass. To the central frame 39 and to its rail 40a, I attach the shoes of the group 28, 28a. The frame 39 is mounted at the top and bottom upon bracket means 41 and 42. The motion may be imparted to each frame or group of frames by mechanical or other means. In this embodiment hydraulic cylinders 43 and 44 are pivoted as indicated in these bracket means. The piston rods 45 and 46 of these hydraulic cylinders are pivotally engaged in blocks 47 and 48 which are fastened onto 49 and 50, extending across between the side frames 24 of the mill and attached thereto. Operation of the hydraulic cylinders 43 and 44, it will be evident, will produce a reciprocatory motion of the frame 39 toward and away from the roll bite. By actuating the hydraulic cylinders 51 in this frame so as to raise and lower its rail 40a in synchronism with the reciprocatory motion of the frame, the shoes 28 and 28a may be caused to grip the slab 1 during that portion of the cycle in which the frame 39 moves toward the roll bite, and to release the slab during the return motion of the frame.

The forward frame 38 and the rear frame 40 are rigidly interconnected by a plurality of bracket means 52, 53, 54 and 55 so that these two frames must move as a unit. Hydraulic cylinders 56, 57, 58 and 59 are pivoted respectively in these brackets. As best shown at the top of Fig. 6, each of these cylinders has a piston rod 60 pivoted to a block 61 fastened respectively to the cross rails 49 and 50. By these means the rails 38 and 40, acting as a unit, may be given a reciprocatory motion toward and away from the roll bite. It is within the scope of my invention to equip the several hydraulic cylinders 43, 44 and 56 to 59 with spring means such as are indicated at 62 in Fig. 6. This enables me to effect the forward stroke of the frame elements under hydraulic power, and a more rapid return stroke under the influence of these springs.

The frame elements ride on rollers 63, 64 and 65 which engage between track elements 66 at the lower corners of the frame (see Fig. 9), and similar trackways on the pistons of hydraulic cylinders 67, 68 and 69 fastened to a bracket 70 which in turn is fastened to a side frame element 24 of the mill. A similar construction is provided at each side frame. By these means the frames 38, 39 and 40 may be raised and lowered.

The various hydraulic cylinders are operated by sequential means in order to produce the following feeding motion: At the end of the forward feeding stroke of the frame elements 38 and 40, at which time the gripping shoes 27 and 27a are in gripping engagement with the slab 1, the frame elements 38 and 40 are raised, thus bringing the upper shoes 27 out of contact with the slab. Simultaneously the beams extending across these frames are lowered by means of the hydraulic cylinders in the frames themselves, thus bringing the lower gripping shoes 27a out of contact with the slab. Then occurs a rapid return stroke of the frames 38 and 40, at the end of which hydraulic cylinders 67 and 69 again lower these frames so as to bring the upper shoes in contact with the slab, while the hydraulic cylinders in the frames raise the beams so as to bring upwardly the gripping shoes 27a. The frames 38 and 40 then begin a forward power traverse for feeding. A similar series of operations occurs in connection with the frame 39 and its gripping shoes 28 and 28a. The return traverse of one set of gripping shoes occurs during the time of the forward feeding traverse of the other set. Since the return traverse is more rapid than the forward traverse, the slab 1 is always gripped by one or the other set of shoes and is never released.

The means for raising the frames so as to raise the upper shoes, and the means for lowering the beams so as to lower the lower shoes also enables me to open up the feeding means when it becomes necessary to thread the mill. Since the hydraulic cylinders 43, 44 and 55 to 59 inclusive exert their thrusts against the rails 49 and 50, it will be seen that in this particular embodiment the feeding thrusts are taken up by the side frame elements 24 of the mill itself.

As shown in Figs. 10 to 13 inclusive, each of the gripping shoes has a body 71 of steel or other suitably strong metal. Provision for water cooling may be made as indicated at 72. The actual gripping surfaces of the shoes are preferably formed of pads or small elements of a suitable heat resisting metal such, for example, as Stellite. Since the pads 73 remain in contact with the highly heated slab for appreciable periods of time, it will be understood that their temperature rises substantially to that of the slab. The pads are made small so that they are unlikely to be cracked by the high heat.

The pads 73 are separated from the body 71 of the gripping shoe by a suitable insulative material of the required physical strength and other characteristics. One example of a suitable construction is that shown in Fig. 10, where a metal bar 74, preferably of stainless steel or other alloy resistant to high temperatures but at the same time having a poor heat conductivity, is shown perforated from side to side with a plurality of holes 75 so as to retard the heat conductivity further.

Figures 10, 11, 12:
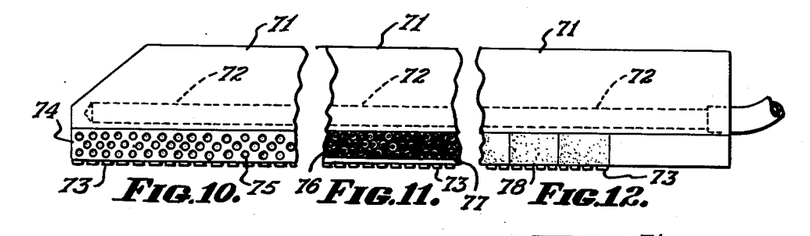
Figs. 10, 11 and 12 are partial side elevations of feeding shoes showing variations of construction.

As shown in Fig. 11, an even more effective construction is provided by welding or otherwise tacking together a plurality of small metal tubes 76 of stainless steel or similar alloy. This construction not only affords a minimum area for heat conductivity between the gripping pads 73 and the body 71 of the gripping shoe, but also makes it necessary for conducted heat to pass through line contacts from tube to tube, the surfaces of which are somewhat oxidized, all of which greatly minimizes the conduction capacity of the shoes. The tubes may be welded together only in spots or at their ends, and the outer surface of the assembly of welded tubes 76 may be faced by a metal bar 77 to which the gripping pads 73 are welded or otherwise attached. The resilience inherent in these constructions is also advantageous.

Excellent insulation of the gripping pads from the bodies of the gripping shoes may be obtained through the use of compressed bodies of metallic shavings, for example, shavings of stainless steel coming from a wet grinding machine, because such metal particles have a diminished contact with each other and obstruct heat flow. In Fig. 12 I have indicated at 78 bodies of insulative material located between the portion 71 of the shoe and the gripping pads 73. These bodies may be of compressed metallic particles, as set forth above, or they may be of non-metallic materials such, for example, as ceramic materials capable of withstanding the crushing and shearing stresses involved.

When employing a ceramic or other heat insulator which is at the same time an electrical insulator, an additional advantage may be gained, in that connections from a suitable source of electric current may be made to the gripping pads 73 in such fashion as to cause the electric current to pass through the gripped slab 1 and thereby increase the heat of the slab.

Figure 17:
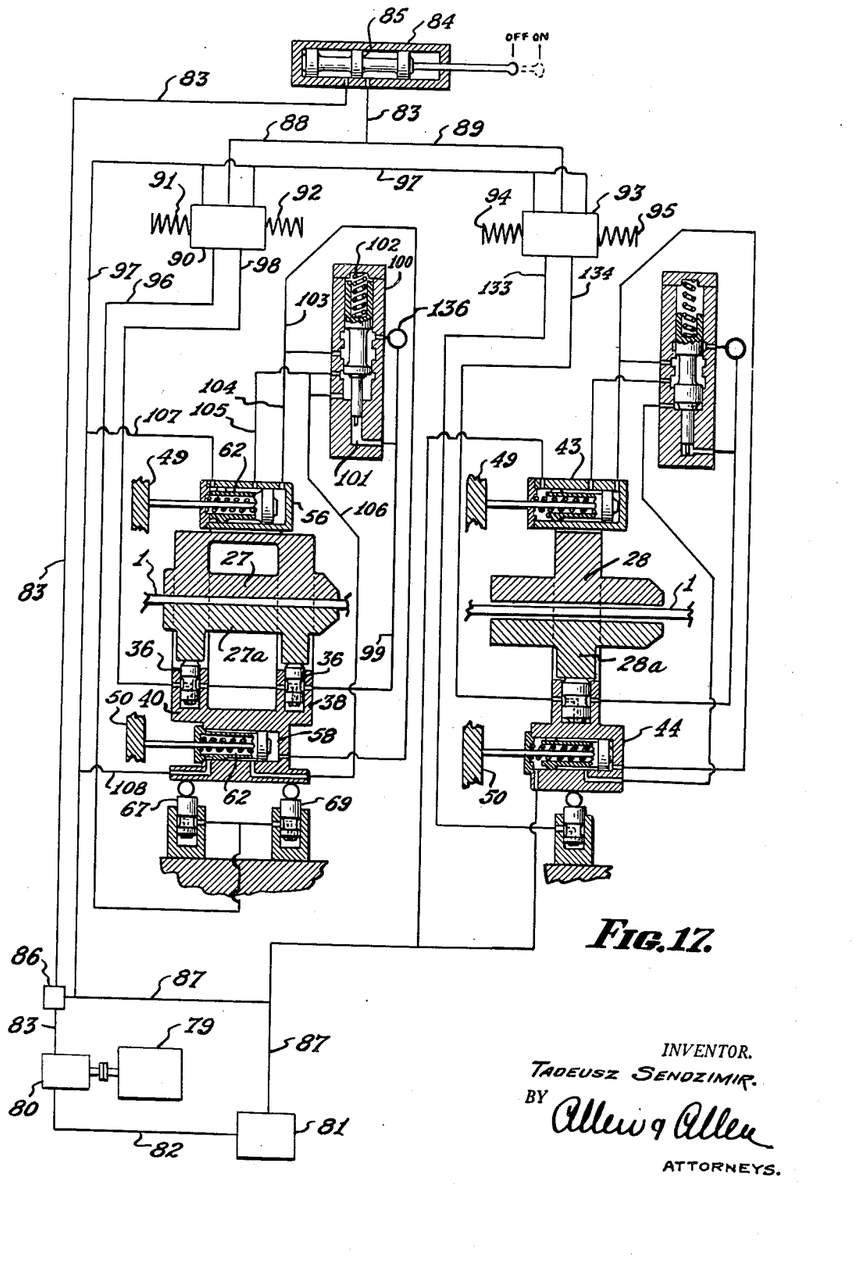
Fig. 17 is a diagrammatic representation of my feeding means in connection with the hydraulic operating means.

There are many mechanisms whereby the feeding apparatus just described may be actuated. In Fig. 17, for the sake of an exemplary showing, I have indicated at 79 an electric motor connected to a variable delivery hydraulic pump 80. The pump receives oil from a supply tank 81 through a low pressure pipe line 82, and delivers it under suitable pressure to the system through a line 83, the rate of delivery of the pump and hence the feeding speed of the forward strokes of the feeding shoes being controlled by proper adjustment of the pump output.

The oil flows through the line 83 to a main control valve 84, the plunger 85 of which is set manually to cause the system to be open or closed to the incoming oil. With this valve set in the "off" position, as when no feeding is desired, the oil is cut off from the system and is returned to the supply tank 81 through an automatic pressure relief valve 86 and a return line 87.

Beyond this main control valve, the high pressure line 83 branches out into two lines 88 and 89, the first actuating the mechanism of the feeding shoes 27, 27a and the other 89 actuating the mechanism of the feeding shoes 28, 28a. The feeding mechanism which has been described above in detail is indicated diagrammatically in Fig. 17.

To trace the flow of oil and the sequence of operations for the shoes 27, 27a, it is pointed out that the oil in the line 88 is delivered to valve 90 which is operated by solenoids 91 and 92. The oil in the line 89 is delivered to a valve 93 which is operated by solenoids 94 and 95, and controls the movements of the shoes 28, 28a. The solenoid 92, when actuated, pulls the plunger of the valve 90 so that a line 96 is closed to the pressure line 88 and opened to a return line 97. When this is done, the supporting hydraulic cylinders 67, 69 for the frames of gripping shoes 27, 27a retract under the weight of the mechanism they support, and the feed shoes of the series 27 are lowered to engage the top of the slab 1. Simultaneously under the action of the solenoid 92, the valve 90 connects a pressure line 98 to the pressure line 88, and the incoming oil actuates the cylinders 36 in the frame elements 38 and 40. The shoes 27a are thus raised into gripping position, as has been described above.

The series of cylinders 36 in the frame are so constructed that the incoming oil under pressure not only actuates them, but also continues on through a line 99, provided with a small accumulator 136 to a pilot operated valve indicated at 100. As the oil under pressure enters the cylinder 101 of this valve, its plunger is forced upwardly against the spring 102. This allows the oil under pressure to flow through the valve 100 and through the pressure lines 103 and 104 to cylinders of the group 56 to 59 connected with the frames 38 and 40. This forces these frames forwardly, pushing against the rails 49 and 50 extending across the mill housings. The speed of this action is controlled by controlling the delivery of the pump 80.

Close to the forward end of the feeding stroke of the gripping shoes 27 and 27a, a limit switch mechanism (not shown) changes the electrical contacts of the solenoids in such a way that solenoid 92 is de-energized and solenoid 91 is made to pull the plunger of the valve 90 back to its original position. This cuts off line 98 from pressure line 88 but opens it to the return line 97. This stops the flow of oil under pressure to pistons 36 and cylinders 56, 59, and instead directs it to line 96, thus causing pistons 67, 69, to lift the frames 38 and 40; but since the line 98 is opened to the return line 97, the oil is forced out of the series of cylinders 36 by weight of the bottom feeding shoes 27a, and the beams to which they are attached. Thus, while the frame is raised, raising shoes 27, shoes 27a are lowered, and the gripping action on the slab 1 ceases.

The reversal of the solenoid valve 90 of course also releases pressure from the pilot operated valve 100, and the spring 102 of this valve returns its plunger to the dead position. Since the cylinders of the group 56 to 59 are fed by the line 98, and therefore have lost their pressure supply, the springs 62 of these cylinders return the entire mechanism comprising frames 38 and 40 back to the original position, ready for the solenoid 92 to be activated again by the limit switch, whereupon the cycle is repeated. As the pistons of cylinders 56 to 59 are returned by the springs 62, the oil is forced out of these cylinders through lines 103 and 104, through the valve 100, out through the lines 105 and 106, through the dead ends of the cylinders 56 to 59 and through lines 107 and 108 provided with suitable flow valves, as explained below in connection with Fig. 14, to line 97 and back to the supply tank 81.

For the actuation of the feed shoes 28 and 28a, identical mechanism and connections are provided. These gripping shoes are actuated through an identical cycle by the solenoid valve 93, which is timed to the solenoid valve 90 in such a way that their actions alternate and overlap to a certain extent. Thus one set of the gripping shoes is in gripping and feeding position at all times.

The timing of the cycles of the system can be accomplished in various ways, but I prefer to make use of the solenoid valves 90 and 93 operated through contacts which are automatically closed and opened by the movement of the feeding shoes themselves as set forth above. The cycling may be maintained by causing the gripping shoes of one group to actuate limit switches for the mechanism of the gripping shoes of another group, as will be readily understood. The electrical connections and limit switches have not been shown since they will be readily understood by the skilled worker in the art.

It has been pointed out above that the force required to overcome the rearward thrust of the working rolls in my mills may vary considerably. When the proportions of the over-all diameter of the planetary roll systems and the slab are such that one pair of rolls only engages the slab at any one time, and between successive engagements of this sort there are intervals when the slab is not contacted by any pair of rolls, a condition exists wherein the horizontal force component produced by the working rolls alternatively reverses direction and varies in magnitude from zero to a maximum according to the position of the work rolls. Under these circumstances it will be seen that a constant force but variable rate feeding instrumentality may cause wide fluctuations in the feeding speed. The slab may even be pulled into the roll bite by the work rolls at certain portions of the cycles to such an extent as to cause damage to the mill. This is an extreme condition, but in any rolling operation where the rearward thrust of the working rolls varies considerably, it is advisable to provide feeding means which will produce forward movement of the slab not only under a sufficient force, but at a constant rate, irrespective of wide variation in the opposing forces, as shown above. It will also be clear that in situations where the work rolls at certain portions of each working cycle actually pull forwardly on the slab, it will be necessary to provide a feeding means capable at these portions of the cycles of retarding the forward motion of the slab.

Figures 13, 14, 15, 16:
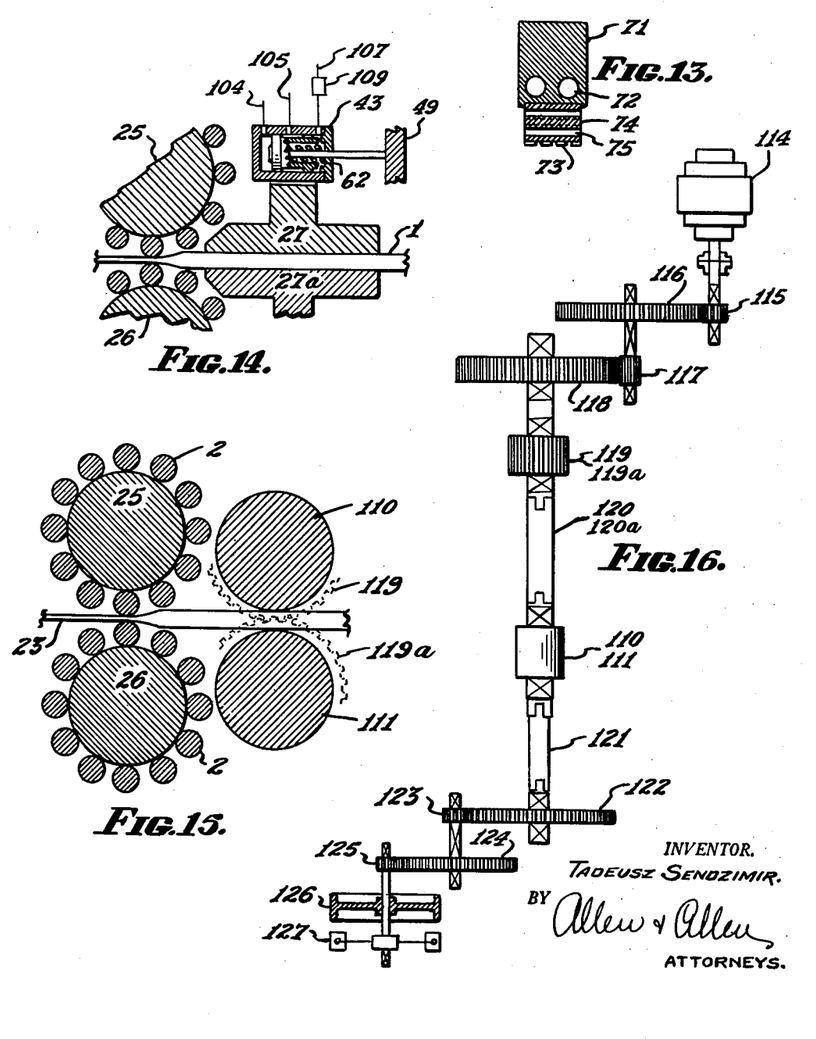
Fig. 13 is a transverse sectional view through the feeding shoe of Fig. 10.
Fig. 14 is a diagrammatic sectional view illustrative of a means for controlling the operation of the feeding means of Figs. 6 to 9 inclusive.
Fig. 15 is a diagrammatic sectional view showing a mill with another form of feeding means.
Fig. 16 is a diagrammatic plan view of a drive means, and controlling means for the device of Fig. 15.

Fig. 14 shows diagrammatically a means to prevent changes in feeding rate applied to an hydraulically operated walking beam feeding mechanism, such as has been described in connection with Figs. 6 to 9 inclusive and 17. A single cylinder 43 has been shown in this figure, but what is said hereinafter will apply to all cylinders of the series 43, 44 and 55 to 59 inclusive. I place flow valves 109 in the oil return lines of these cylinders, to control the return flow of oil during the forward feeding stroke. Regardless of the magnitude or direction of the feeding force, oil can only escape from the low pressure sides of these cylinders through the control valves, one of which is indicated at 109. Thus these valves function to hold the feeding rate constant, irrespective of changes in the back pressure exerted by the mill.

As will be described in connection with Figs. 15 and 16, where the feeding mechanism consists of pinch rolls 110 and 111, it is readily possible to control the feeding rate of the slab by adding a high-speed fly wheel and driving it from the feed roll pinion stand. By so doing, I cause the inertia of the fly wheel to eliminate any fluctuations in the speed of the feed rolls which would otherwise tend to arise because of variations in the axial forces exerted by the planetary work rolls upon the slab. The speed of the slab is thereby held constant, since any tendency to slow down is resisted by the motor drive of the feed rolls, and any tendency to speed up is resisted by the inertia of the fly wheel. In Fig. 15, the feed rolls 110 and 111 are geared together as at 119, 119a. As shown in Fig. 16, an electric motor 114 is provided with a speed reduction gearing consisting of pinion 115, gear 116, pinion 117, and gear 118, and drives the upper pinion of a pinion stand 119 through this train of gearing. The pinion stand is connected to the upper feed roll 110 by a connector 120 and to the lower feed roll by a connector 120a.

The lower feed roll 111 is connected by a spindle 121 through a chain of speed increase gearing consisting of gear 122, pinion 123, gear 124 and pinion 125, to a fly wheel 126. I may also mount on the fly wheel shaft an adjustable fan air drag 127.

By connecting the drive to one of the feed rolls, namely the roll 110, and by connecting the drag mechanism to the other feed rolls, namely the roll 111, the backlash of the pinion stand is taken up and both the bottom and top feed rolls are controlled from speeding up by the action of the fly wheel. In this fashion the speed of feeding of the slab 1 may be held constant regardless of variations in the reverse forces exerted by the mill rolls.

Modifications may be made in my invention without departing from the spirit of it. Having thus described my invention in certain exemplary embodiments, what I claim as new and desired to secure by Letters Patent is:

1. Feeding means for a slab to be fed into the bite of a planetary mill, said feeding means comprising upper and lower gripping shoes for a slab, said upper and lower shoes being divided into groups of alternate shoes, means for bringing the shoes of each group into and out of gripping relation with said slab, means for moving the several shoes in a reciprocatory fashion toward and away from said mill, and means for correlating the gripping and reciprocatory movements of the groups of shoes so that one group of shoes is in gripping engagement with said slab, and feeding it toward said mill, while another group of shoes is out of engagement with said slab and moving away from said mill.

2. The structure claimed in claim 1 wherein said mill has housings, wherein said groups of shoes are respectively mounted in separate frames, wherein said frames are actuated in their movements toward and away from said mill by hydraulic cylinders having engagement with said frames and engagement with beams extending across between said mill housings.

3. The structure claimed in claim 1 wherein said mill has housings, wherein said groups of shoes are respectively mounted in separate frames, wherein said frames are actuated in their movements toward and away from said mill by hydraulic cylinders having engagement with said frames and engagement with beams extending across between said mill housings, wherein the upper shoes of said groups are attached respectively to their frames, wherein the lower shoes of said groups are attached respectively to beams in their frames, and wherein hydraulic means is provided in each frame for raising said beams to effect clamping engagement of the upper and lower shoes.

4. The structure claimed in claim 1 wherein said mill has housings, wherein said groups of shoes are respectively mounted in separate frames, wherein said frames are actuated in their movements toward and away from said mill by hydraulic cylinders having engagement with said frames and engagement with beams extending across between said mill housings, wherein the upper shoes of said groups are attached respectively to their frames, wherein the lower shoes of said groups are attached respectively to beams in their frames, wherein hydraulic means is provided in each frame for raising said beams to effect clamping engagement of the upper and lower shoes, and wherein hydraulic means are attached respectively to said frames and to the mill housings for raising and lowering said frames.

5. The structure claimed in claim 1 wherein said mill has housings, wherein said groups of shoes are respectively mounted in separate frames, wherein said frames are actuated in their movements toward and away from said mill by hydraulic cylinders having engagement with said frames and engagement with beams extending across between said mill housings, wherein the upper shoes of said groups are attached respectively to their frames, wherein the lower shoes of said groups are attached respectively to beams in their frames, wherein hydraulic means is provided in each frame for raising said beams to effect clamping engagement of the upper and lower shoes, wherein hydraulic means are attached respectively to said frames and to the mill housings for raising and lowering said frames, and wherein means is provided to actuate said several hydraulic means in a predetermined sequence for feeding.

6. The structure claimed in claim 1 wherein said mill has housings, wherein said groups of shoes are respectively mounted in separate frames, wherein said frames are actuated in their movements toward and away from said mill by hydraulic cylinders having engagement with said frames and engagement with beams extending across between said mill housings, wherein the upper shoes of said groups are attached respectively to their frames, wherein the lower shoes of said groups are attached respectively to beams in their frames, wherein hydraulic means is provided in each frame for raising said beams to effect clamping engagement of the upper and lower shoes, wherein hydraulic means are attached respectively to said frames and to the mill housings for raising and lowering said frames, wherein means is provided to actuate said several hydraulic means in a predetermined sequence for feeding, and wherein the said hydraulic cylinders for producing feeding movements of said frames are provided with means to enforce a constant rate of feeding movement irrespective of variations in forces resisting the feeding movement.

7. In combination with a planetary mill, a feeding means comprising upper and lower sets of gripping shoes divided into groups, means for causing the shoes of the different groups sequentially to come into clamping engagement with a slab of metal to be fed into said mill, to move toward said mill whereby to impart a forcible feeding movement to said slab, to come out of gripping engagement with said slab and to return to starting position, and means for enforcing a constant rate of forward movement for said groups of shoes while feeding, so as to cause the rate of feeding to be constant irrespective of variations in the forces resisting the feeding movement of said slab.

8. In a feeding mechanism for planetary mills, a feeding and gripping shoe comprising an elongated metal body, an insulative material located along one edge thereof, and spaced feeding pads of heat resisting metal alloy attached to said insulating material and forming a gripping surface.

9. The structure claimed in claim 8 wherein said elongated metal body has means for water cooling.

10. The structure claimed in claim 9 wherein said insulative material is a body of metal of low heat conductivity perforated transversely with holes to decrease the rate of heat transmission therethrough.

11. The structure claimed in claim 9 wherein said insulative material is a body of metallic substance in divided form, the individual elements going to make up said body having limited contact with each other whereby said body has a limited rate of heat conduction.

12. The structure claimed in claim 9 wherein said insulative material is a body of metallic substance in divided form, the individual elements going to make up said body having limited contact with each other whereby said body has a limited rate of heat conduction, and said body being composed of metallic tubing in parallel and contacting relationship and fastened together by welding.

13. The structure claimed in claim 9 wherein said insulative material is a body of ceramic.

14. In combination with a planetary mill having a roll bite, a feeding means for slabs to be rolled in said mill, said feeding means comprising upper and lower gripping shoes divided into groups, means for bringing each group of upper and lower shoes into and out of gripping engagement with a slab, and means for moving the groups of shoes successively toward and away from said mill whereby to produce a feeding movement of said slab, said shoes comprising elongated bodies having tapered front portions extending into close proximity to the bite of said mill.

References Cited in the file of this patent

UNITED STATES PATENTS

| | | |
|---|---|---|
| 1,499,533 | Katzenmeyer | July 1, 1924 |
| 1,499,534 | Katzenmeyer | July 1, 1924 |
| 1,851,063 | Ramsey | Mar. 29, 1932 |
| 2,083,660 | Nyberg | June 15, 1937 |